US011261024B2

(12) United States Patent
Okamoto et al.

(10) Patent No.: US 11,261,024 B2
(45) Date of Patent: Mar. 1, 2022

(54) HIGH DENSITY STOCKER

(71) Applicants: DAIFUKU AMERICA CORPORATION, Reynoldsburg, OH (US); DAIFUKU CO., LTD., Osaka (JP)

(72) Inventors: Akira Okamoto, Hillsboro, OR (US); Kazuya Omori, Chandler, AZ (US)

(73) Assignees: DAIFUKU AMERICA CORPORATION, Reynoldsburg, OH (US); DAIFUKU CO., LTD., Osaka (JP)

( * ) Notice: Subject to any disclaimer, the term of this patent is extended or adjusted under 35 U.S.C. 154(b) by 76 days.

(21) Appl. No.: 16/606,042

(22) PCT Filed: Apr. 9, 2018

(86) PCT No.: PCT/US2018/026674
§ 371 (c)(1),
(2) Date: Oct. 17, 2019

(87) PCT Pub. No.: WO2018/194873
PCT Pub. Date: Oct. 25, 2018

(65) Prior Publication Data
US 2021/0139238 A1 May 13, 2021

Related U.S. Application Data

(60) Provisional application No. 62/487,757, filed on Apr. 20, 2017.

(51) Int. Cl.
*B65G 1/04* (2006.01)

(52) U.S. Cl.
CPC .................. *B65G 1/0421* (2013.01)

(58) Field of Classification Search
CPC .... H01L 21/67769; B65G 1/02; B65G 1/0407
See application file for complete search history.

(56) References Cited

U.S. PATENT DOCUMENTS 6,224,313 B1 * 5/2001 Fukushima .......... B65G 1/0407
414/280
6,273,261 B1 8/2001 Hosoi
6,678,583 B2 * 1/2004 Nasr ....................... B25J 9/046
206/710

(Continued)

FOREIGN PATENT DOCUMENTS

CN 1802222 A 7/2006
CN 102085658 A 6/2011

(Continued)

OTHER PUBLICATIONS

Chinese Office Action from corresponding Chinese Application No. 201880025362.2, dated Aug. 13, 2020, 30 pages, English Translation of the Chinese Office Action is Included.

(Continued)

*Primary Examiner* — Kaitlin S Joerger
(74) *Attorney, Agent, or Firm* — Dickinson Wright PLLC

(57) ABSTRACT

An article storage device is provided for holding a plurality of standardized containers. The standardized containers extend between a bottom surface extending generally horizontally and a top surface spaced from and generally parallel to the bottom surface. The standardized containers further include an opening side perpendicular to the top and bottom surfaces and a door flange extending along the opening side and beyond the top surface. The standardized containers further include a lifting flange attached to the top surface for receiving a lifting tool. The standardized containers are disposed in the storage rack with their respective opening sides facing away from an access space for allowing a retrieval transport apparatus to move in a substantially horizontal plane between the access space to engage the lifting flange without being obstructed by the door flange.

11 Claims, 7 Drawing Sheets

(56) References Cited

U.S. PATENT DOCUMENTS

| | | | | |
|---|---|---|---|---|
| 7,039,499 | B1 * | 5/2006 | Nasr | B25J 9/046 |
| | | | | 206/710 |
| 7,695,234 | B2 * | 4/2010 | Yamashita | B65G 1/0407 |
| | | | | 414/277 |
| 8,827,621 | B2 * | 9/2014 | Inagaki | H01L 21/67733 |
| | | | | 414/282 |
| 9,728,434 | B2 * | 8/2017 | Inagaki | H01L 21/67733 |
| 10,287,096 | B2 * | 5/2019 | Yoshimoto | A47B 57/56 |
| 10,625,938 | B2 * | 4/2020 | Horii | B65G 1/0485 |
| 10,766,697 | B2 * | 9/2020 | Abe | B65G 1/0407 |
| 10,773,887 | B2 * | 9/2020 | Omori | H01L 21/67769 |
| 10,957,570 | B2 * | 3/2021 | Abe | H01L 21/67379 |
| 2003/0113190 | A1 | 6/2003 | Bachrach | |
| 2011/0222994 | A1 | 9/2011 | Inagaki et al. | |
| 2015/0255319 | A1 | 9/2015 | Kikuchi et al. | |
| 2016/0343598 | A1 * | 11/2016 | Sakaguchi | H01L 21/0271 |
| 2019/0031440 | A1 * | 1/2019 | Ito | B65G 1/0464 |
| 2019/0217873 | A1 * | 7/2019 | Imahori | H01L 21/67769 |
| 2019/0375593 | A1 * | 12/2019 | Sai | H01L 21/67736 |

FOREIGN PATENT DOCUMENTS

| | | |
|---|---|---|
| CN | 102683251 A | 9/2012 |
| CN | 103733324 A | 4/2014 |
| JP | H08172121 A | 7/1996 |
| JP | 2003039376 A | 2/2003 |
| JP | 2005150495 A | 6/2005 |
| JP | 2007022677 A | 2/2007 |
| JP | 2008174357 A | 7/2008 |
| JP | 2009227415 A | 10/2009 |
| JP | 2011218538 A | 11/2011 |
| JP | 4973209 B2 | 7/2012 |
| JP | 5284808 B2 | 9/2013 |
| KR | 101244381 B1 | 4/2013 |
| KR | 20140144582 A | 12/2014 |
| WO | 9910257 A1 | 3/1999 |
| WO | 0062332 A1 | 10/2000 |
| WO | 0204176 A1 | 1/2002 |

OTHER PUBLICATIONS

Japanese Office Action from the Japanese Patent Office for corresponding Japanese Patent Application No. 2019-556806 dated Apr. 19, 2021, 6 pages.

Chinese Office Action from the Chinese Patent Office for related Chinese Invention Application No. 201880025362.2 dated Apr. 26, 2021, 12 page(s).

* cited by examiner

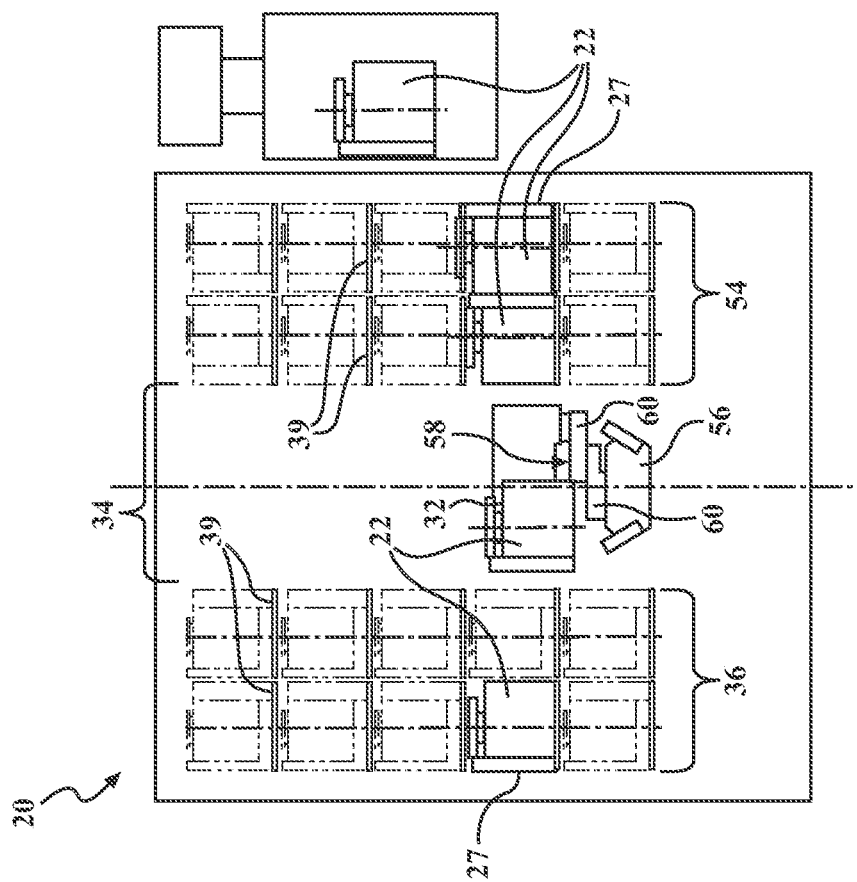
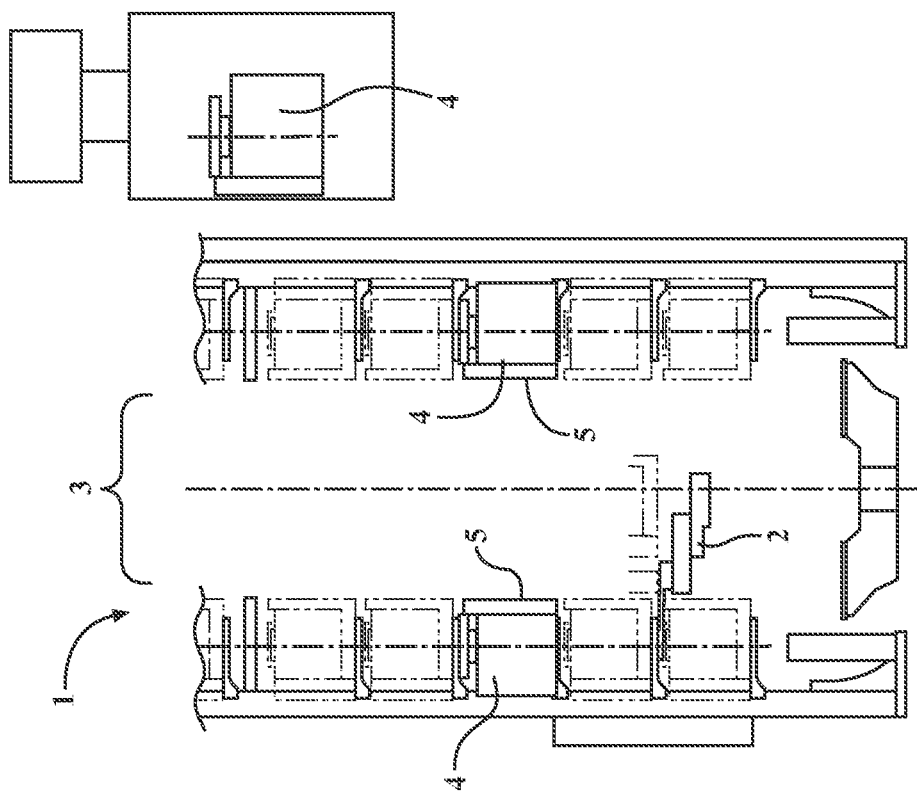
FIG. 2
FIG. 1
PRIOR ART

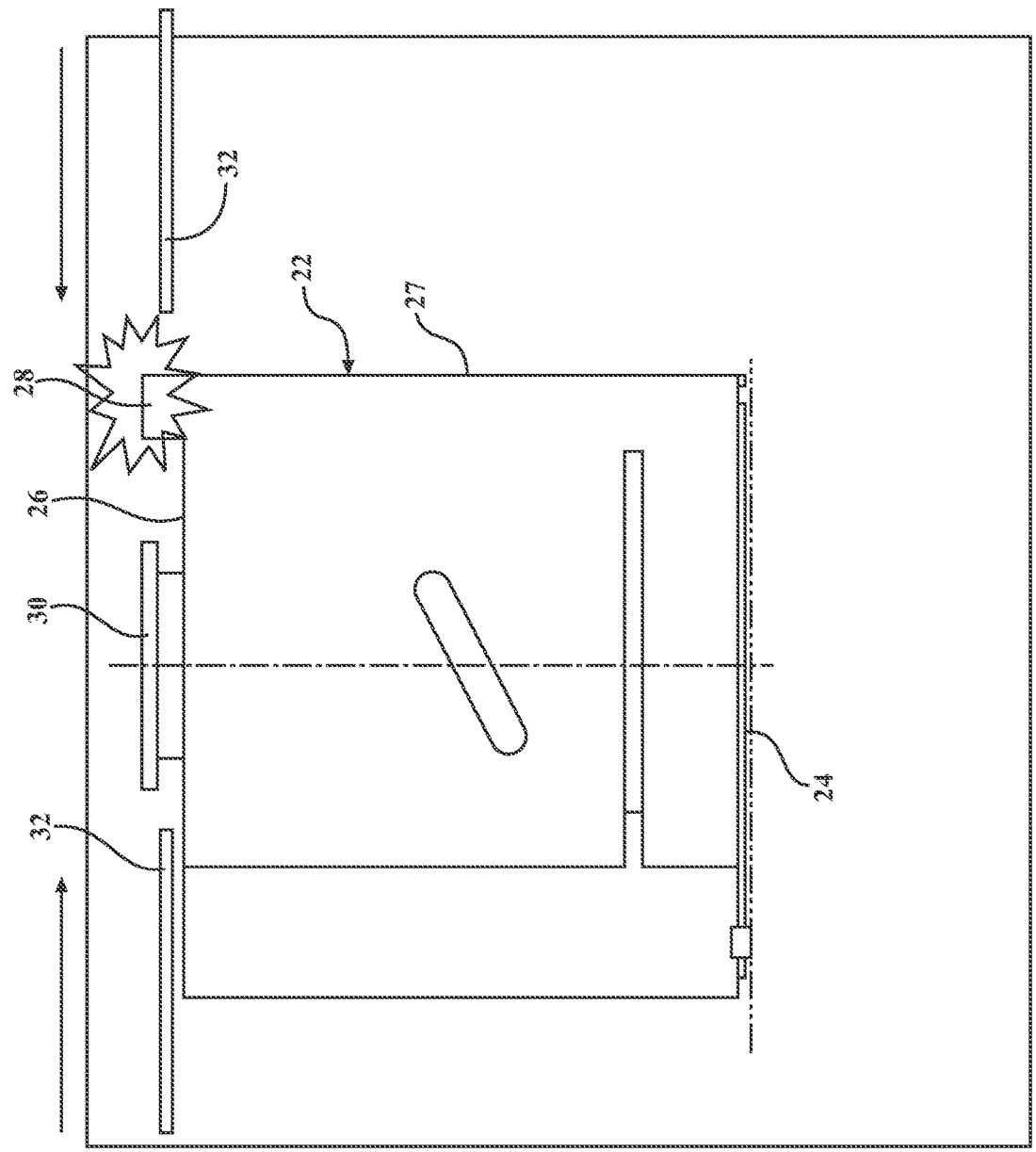

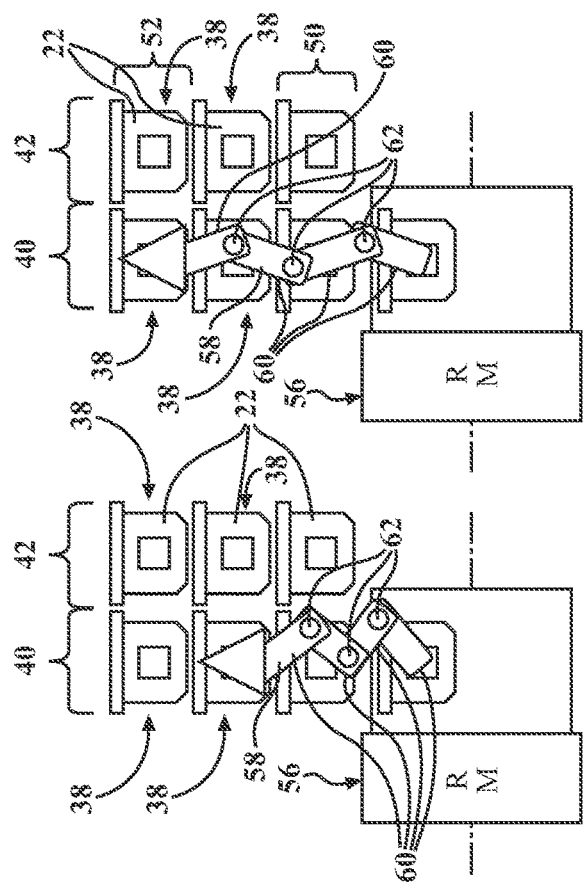
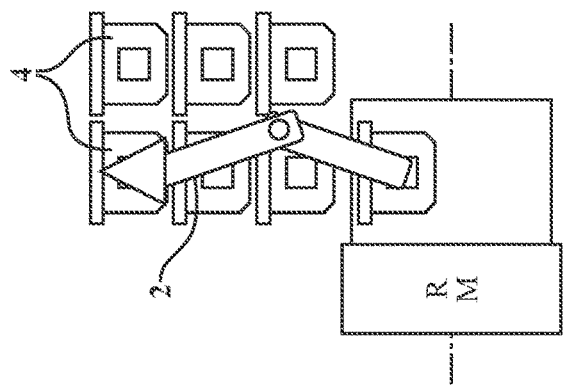
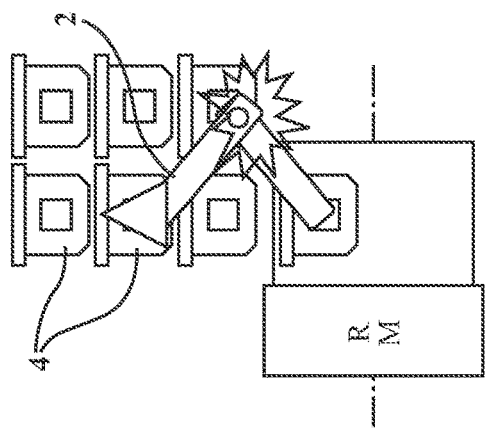
FIG. 8A PRIOR ART
FIG. 8B PRIOR ART
FIG. 9A
FIG. 9B

HIGH DENSITY STOCKER

This U.S. National Stage Patent Application claims the benefit of PCT International Patent Application Serial No. PCT/US2018/026674 filed Apr. 9, 2018 entitled "High Density Stocker" which claims the benefit of U.S. Provisional Patent Application Ser. No. 62/487,757 filed Apr. 20, 2017 entitled "High Density Stocker," the entire disclosures of the applications being considered part of the disclosure of this application and hereby incorporated by reference.

This PCT International Patent Application claims the benefit of U.S. Provisional Patent Application Ser. No. 62/487,757 filed Apr. 20, 2017 entitled "High Density Stocker," the entire disclosure of the application being considered part of the disclosure of this application and hereby incorporated by reference.

TECHNICAL FIELD

A system and method for an article storage device for storing a plurality of standardized containers. More specifically, an article storage device that includes a storage rack for storing standardized containers and a storage and retrieval transport apparatus for moving the standardized containers into and out of the storage rack.

BACKGROUND

Article storage devices, also called stockers (STKs), are used in a number of industries for holding standardized containers articles of manufacture or components thereof. Specialized versions of article storage devices may include special features for specific applications. For instance, stockers used for holding front opening unified pods (FOUPs) in semiconductor fabrication plants may include enclosures for maintaining a controlled atmosphere and specialized interfaces for interacting with an automated material handling system (AMHS) which may include overhead shuttles (OHS) and/or overhead track (OHT) vehicles. It is a generally standard practice for AMHS systems to deliver FOUPS with the opening facing toward the destination machine. As shown in FIG. 1, article storage devices 1 of the prior art generally include a storage and retrieval transport apparatus 2 that moves in an access space 3, and store the FOUPs 4 with the opening 5 facing the access space 3.

Plant floor space, and particularly floor space accessible to an AMHS, is at a cost premium, and therefore an article storage device which can store more standardized containers in a given amount of space could provide a significant cost savings. Furthermore, by storing standardized containers in closer proximity to one another, they may be retrieved or stored in a lower amount of time, thereby increasing the efficiency of the associated system or systems.

In view of the foregoing, there remains a need for improvements to article storage devices to hold more standardized containers within a given space.

SUMMARY OF THE INVENTION

An article storage device is provided for holding a plurality of standardized containers. The standardized containers may define an interior space for holding a plurality of semiconductor wafers. Each standardized container may extend between a bottom surface extending generally horizontally and a top surface spaced from and generally parallel to the bottom surface. The standardized containers may include an opening side perpendicular to the top and bottom surfaces for providing access to the interior space and may also include a door flange extending along the opening side and beyond the top surface. The standardized containers may further include a lifting flange attached to the top surface for receiving a lifting tool, also called a chuck, for lifting the standardized container.

An access space may be provided for allowing movement of the standardized containers. The article storage device may include a first storage rack adjacent the access space and including a plurality of positions each configured to hold one of the standardized containers. A storage and retrieval transport apparatus, which may also be called a Rack Master (RM), may be movable within the access space and may include an arm configured to move a chuck into the storage rack to engage a standardized container and to thereby move the standardized container to or from a position within the storage rack.

According to an aspect of the invention, the standardized containers may each be disposed in the storage rack with their respective opening sides facing away from the access space for allowing the chuck of the retrieval transport apparatus to move in a substantially horizontal plane between the access space to engage the lifting flange of one of the standardized containers without being obstructed by the door flange.

According to another aspect of the invention, the arm of the storage and retrieval transport apparatus may include a plurality of segments with a joint between each of the segments, and with a total of at least three joints for positioning the lifting tool into engagement with any of the standardized containers in the rack without contacting any other ones of the standardized containers in said rack.

By orienting the opening side and the associated door flange facing away from the access space, the chuck may slide horizontally into position to engage the lifting flange of the standardized container while requiring a minimal clearance above the standardized container which may allow the racks to be configured with a lower vertical storage pitch and thereby lessening the vertical height of the rack required to hold a given number of standardized containers. As shown in FIGS. 4-5, the vertical storage pitch may be reduced, for example, from 453 mm to 380 mm.

By constructing the arm of the storage and retrieval transport apparatus to include a plurality of segments with a joint between each of the segments, and with a total of three or more hinged joints, the arm of the present invention may allow for racks having three or more layers deep and with a lateral storage pitch lower than that of the prior art, thereby allowing for racks which can hold a greater number of standardized containers in a given footprint area.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is side sectional view of an article storage device of the prior art;

FIG. 2 is side sectional view of an article storage device in accordance with an aspect of the present disclosure;

FIG. 3 is side sectional view of a standardized container;

FIG. 8A is a top schematic view of a storage and retrieval transport apparatus of the prior art including an arm in a partially extended position and interfering with a standard container in the storage rack;

FIG. 8B is another top schematic view of the storage and retrieval transport apparatus of FIG. 8A with the arm in a fully extended position;

FIG. 9A is a top schematic view of a storage and retrieval transport apparatus in accordance with another aspect of the present disclosure including an arm in a partially extended position;

FIG. 9B is another top schematic view of the storage and retrieval transport apparatus of FIG. 9A with the arm in a fully extended position;

DESCRIPTION OF THE ENABLING EMBODIMENTS

Figure 5:
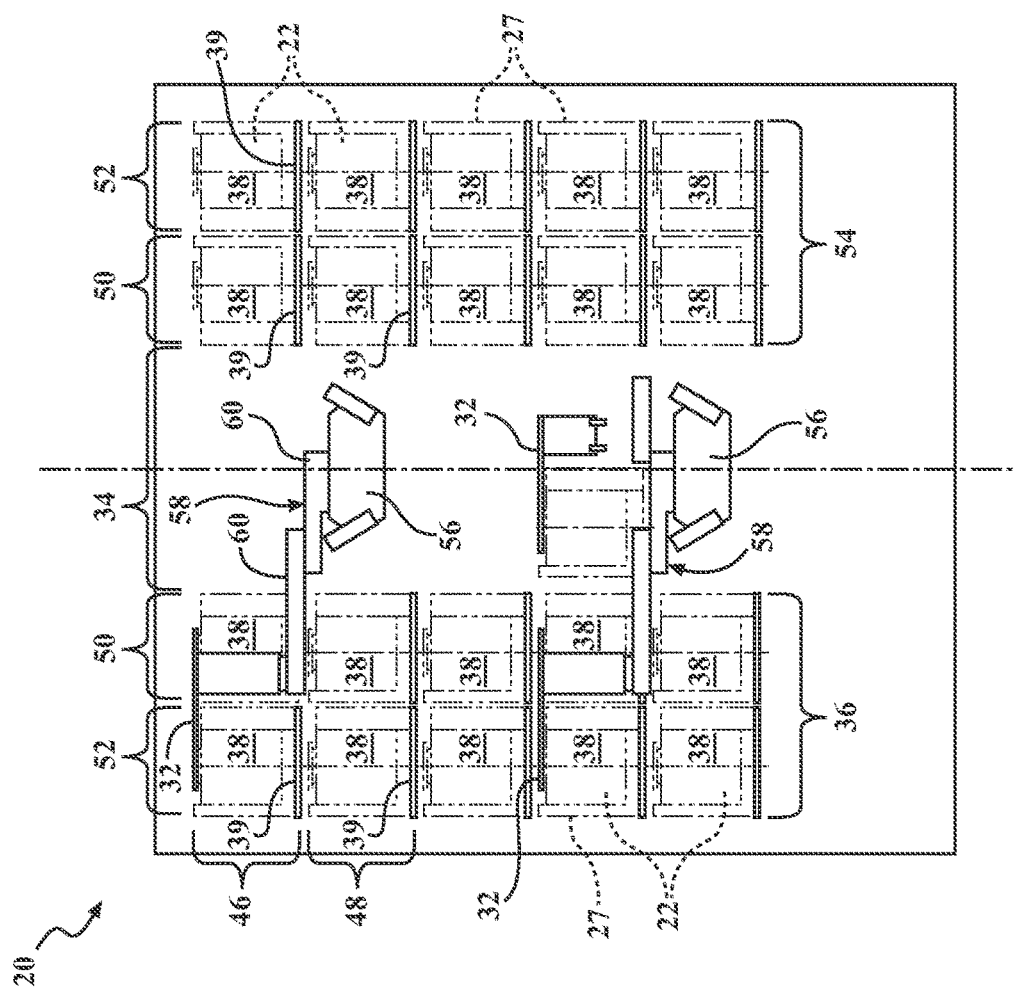
FIG. 5 is side sectional view of an article storage device in accordance with an aspect of the present disclosure.

Referring to the Figures, wherein like numerals indicate corresponding parts throughout the several views, an article storage device 20 is provided for holding a plurality of standardized containers 22. The standardized containers 22 may be front opening unified pods (FOUPs) commonly used in semiconductor fabrication plants for holding and transporting semiconductor wafers, and which may define an interior space for holding a plurality of semiconductor wafers. As best shown in FIG. 3, each standardized container 22 may extend between a generally horizontal bottom surface 24 and a top surface 26 spaced from and generally parallel to the bottom surface 24. The standardized containers 22 may include an opening side 27 perpendicular to the top and bottom surfaces 26, 24 for providing access to the interior space and may also include a door flange 28 along the opening side 27 and extending beyond the top surface 26 opposite the bottom surface 24. In other words, the door flange 28 may extend above the top surface 26. The standardized containers 22 may further include a lifting flange 30 attached to extending generally parallel and spaced apart from the top surface 26 for receiving a lifting tool 32 for lifting the standardized container 22.

Figure 4:
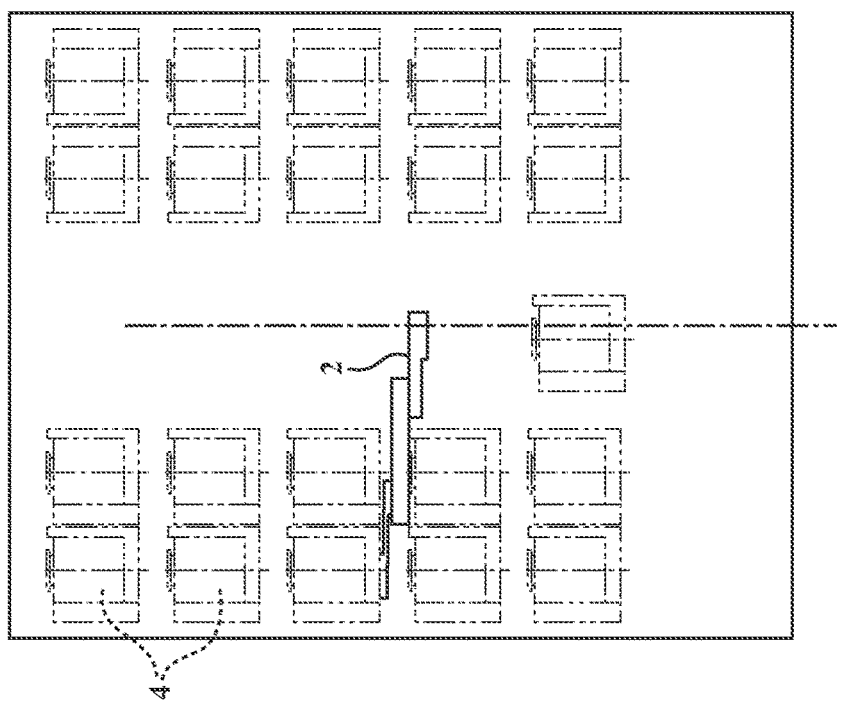
FIG. 4 is side sectional view of an article storage device of the prior art.

As best shown in FIGS. 4 and 5, an access space 34 may be provided for allowing movement of the standardized containers 22. The access space 34 may be enclosed within the article storage device 20. The article storage device 20 may include a first storage rack 36 including a plurality of positions 38 each configured to receive and hold one of standardized containers 22. Each of the positions may include one or more shelves 39 for holding the containers 22.

Figure 6:
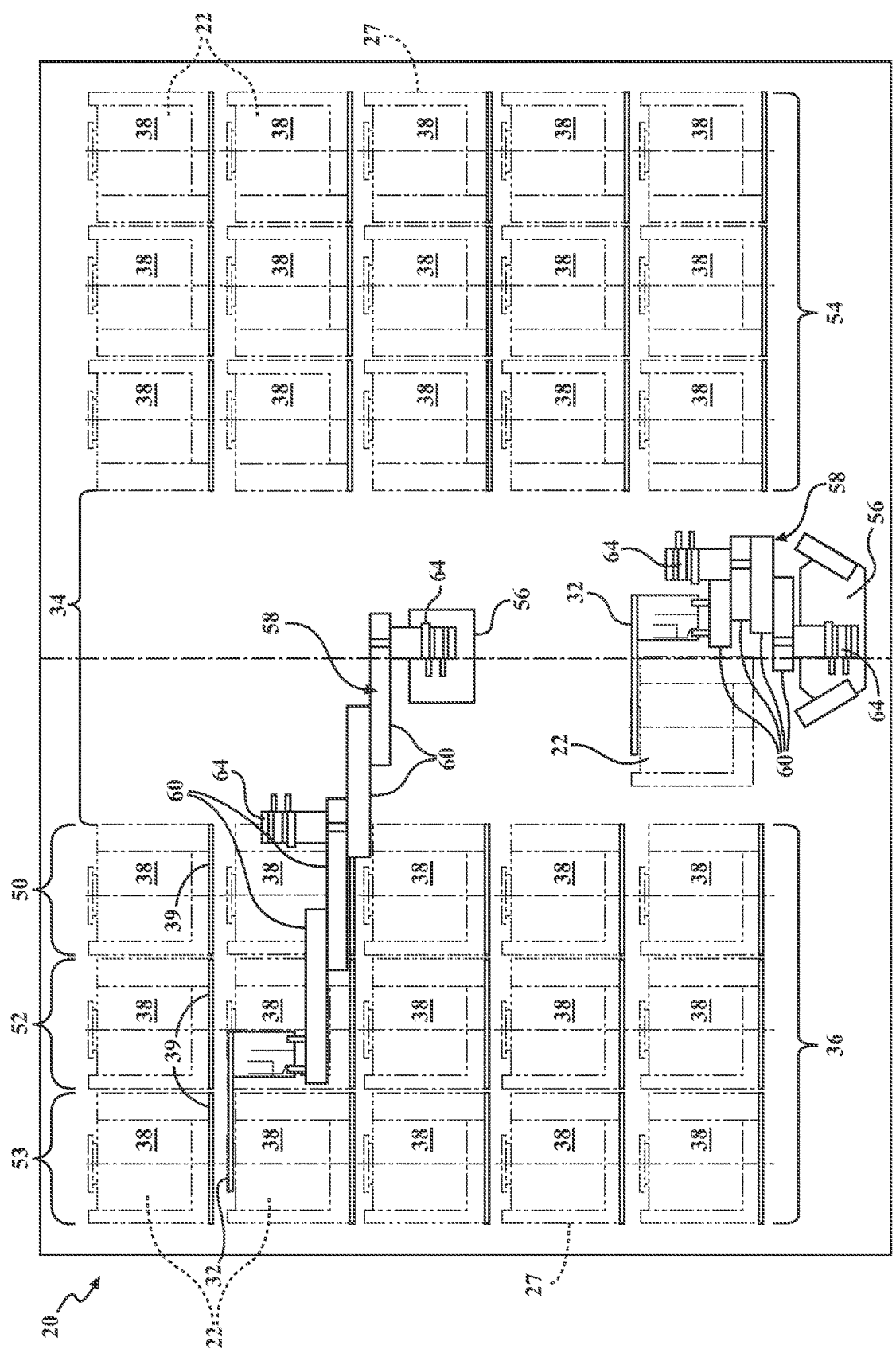
FIG. 6 is side sectional view of an article storage device in accordance with another aspect of the present disclosure.

As best shown in FIG. 5, the first storage rack 36 may include the plurality of positions 38 arranged in a first row 46 and a second row 48 vertically stacked on top of one another and adjacent thereto and defining a vertical storage pitch as the vertical distance between the bottom surface 24 of one of the standardized containers 22 disposed in the first row 46 and the bottom surface 24 of another one of the standardized containers 22 in the next vertically adjacent row. The first storage rack 36 may also include the plurality of positions 38 arranged in at least two different levels 50, 52 including a first level 50 spaced a first horizontal depth away from the access space 34 and a second level 52 spaced a second horizontal depth greater than the first depth away from the access space 34. Furthermore, the plurality of positions 38 may also be layered in a width being in a direction perpendicular to the directions of the rows 46, 48 and levels 50, 52. As shown in FIG. 6, the storage racks 36, 38 may include an additional level 55, such that there are three levels 50, 52, 53. It should be appreciated that any number of rows, levels and widths may be utilized. As best shown in FIGS. 9A-9B, the first storage rack 36 may include the plurality of positions 38 arranged in a first column 40 and a second column 42 laterally adjacent thereto and defining a lateral storage pitch as the lateral distance between a given location on one of the standardized containers 22 disposed in the first column 40, such as its center, and the same given location of another one of the standardized containers 22 disposed in the second column 42.

As shown in FIGS. 2, 5, and 6, the article storage device 20 of the present disclosure may include a second storage rack 54 substantially identical to the first storage rack 36 and arranged at a mirror image orientation with the access space 34 extending between the first storage rack 36 and the second storage rack 54. According to an aspect, a given one of the positions 38 having an associated storage rack and column and row may be designated as an accessible position when that position 38 is not obstructed by one of the standardized containers 22 in the same given rack and column and row and in a level between that position 38 and the access space 34.

A storage and retrieval transport apparatus 56, also called a Rack Master (RM), may be movable within the access space 34 and may include one or more arms 58 configured to move a lifting tool 32 into either of the storage racks 36, 54 to engage a standardized container 22 and to thereby allow the retrieval transport apparatus to move the standardized container 22 between the position 38 within the storage rack 36, 54 and the access space 34. According to an aspect, the lifting tool 32 of the storage and retrieval transport apparatus 56 may be a chucking type device, which may be called a chuck 32. The storage and retrieval transport apparatus 56 may also move the standardized container 22 to another destination such as a different position 38 within one of the storage racks 36, 54 or to another place such as, for example, a dock to be conveyed out of the storage and retrieval transport apparatus 56. As is shown in FIG. 6, the article storage device 20 may include more than one storage and retrieval transport apparatus 56.

According to an aspect of the disclosure the standardized containers 22 may each be disposed in the storage racks 36, 54 with their respective opening sides 27 facing away from the access space 34 for allowing the chuck 32 of the retrieval transport apparatus to move in a substantially horizontal plane between the access space 34 to engage the lifting flange 30 of one of the standardized containers 22 without being obstructed by the door flange 28. For example, as best shown in FIGS. 2 and 6, the standardized containers 22 may each be disposed in the storage racks 36, 54 with their respective opening sides 27 farthest from the access space 34 and thereby positioning the door flanges 28 opposite the storage and retrieval transport apparatus 56. The standardized containers 22 may also be oriented with their respective opening sides 27 facing perpendicularly or sidewise to the access space 34, which may also provide unobstructed horizontal access to the lifting flanges 30. According to an aspect, the chuck 32 of the retrieval transport apparatus may be configured as a fork including a pair of generally parallel members, and the horizontal engagement of the standardized containers 22 may be called "forking" or "chucking." As illustrated in the upper-right side of FIG. 3, if the standardized container 22 is oriented with the door flange 28 facing the access space 34, the door flange 28 may cause mechanical interference and block the chuck 32 from moving horizontally to the lifting flange 30.

With the door flanges 28 being oriented as to allow unobstructed horizontal access to the lifting flanges 30, the article storage device 20 of the present disclosure allows the standardized containers 22 to be moved into and out of the storage racks 36, 54 using the lifting flanges as shown in FIG. 5 instead of requiring them to be lifted from their bottom surfaces 24 as is generally done in the prior art and as illustrated in FIG. 4. In this way, the arm 58 of the storage and retrieval transport apparatus 56 may be located substantially within the same row as the standardized container 22 to be moved, thereby allowing the vertical storage pitch to be reduced, for example, from 453 mm to 380 mm as shown in FIGS. 4-5.

Figure 7A:
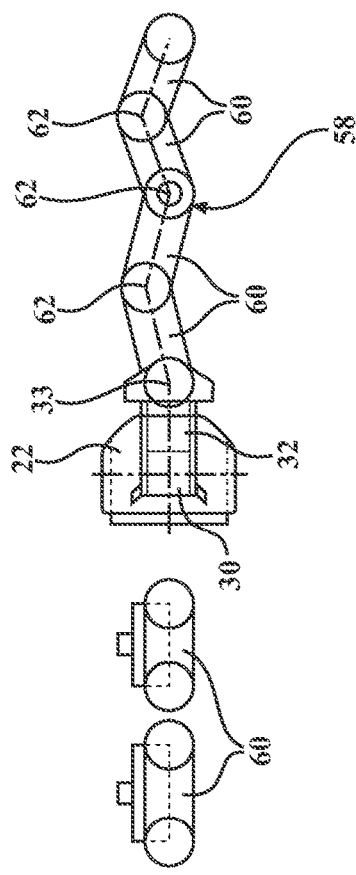
FIG. 7A is a top view of a storage and retrieval transport apparatus arm in accordance with another aspect of the present disclosure.
Figure 7C:
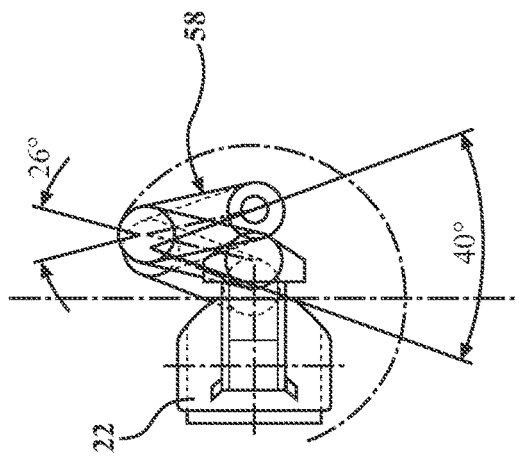
FIG. 7C is a top view of the storage and retrieval transport apparatus arm of FIG. 7A in an alternative configuration.
Figure 7B:
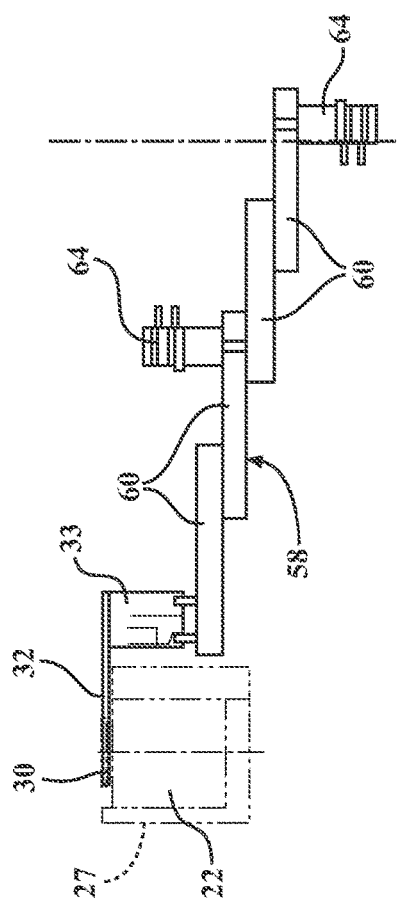
FIG. 7B is a side view of the storage and retrieval transport apparatus arm of FIG. 7A.
Figure 7D:
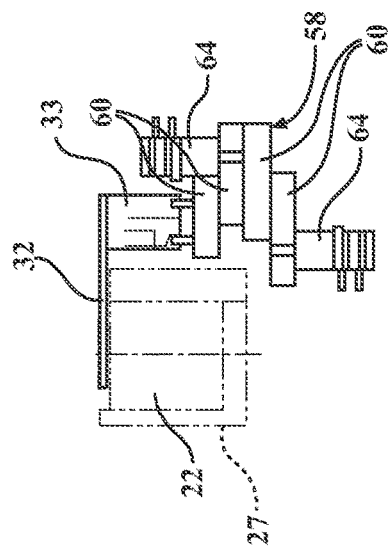
FIG. 7D is a side view of the storage and retrieval transport apparatus arm in the configuration of FIG. 7C.

According to an aspect, and as best shown in FIGS. 7A-7D, the arm 58 of the storage and retrieval transport apparatus 56 may include a Selective Compliance Articulated Robot Arm 58 (SCARA) comprising a plurality of four or more segments 60 with a hinged joint 62 between each of the segments 60. In other words, the arm 58 may include three or more joints 62 between the segments 60. According to an aspect, the arm 58 may be actuated by two or more motors 64, with each motor 64 causing two segments 60 separated by a joint 62 to be moved relative to one another. In this way, the arm 58 may cause the chuck 32 to engage any of the standardized containers 22 in the racks 36, 54 without contacting any other ones of the standardized containers 22 in the racks 36, 54. As best shown in FIGS. 7A-7B, the segments 60 may be arranged in pairs, with each pair being actuated by a motor 64. As best shown in FIG. 7B, a chuck actuator 33 may be provided to cause the chuck 32 to engage or disengage the lifting flange 30 of a standardized container 22.

Also, as shown in FIG. 7A, the pair of first segments 60 closest to the chuck 32 of the storage and retrieval transport apparatus 56 may have a longer length than second segments 60 farthest from the chuck 32. For instance, the segments 60 closest to the chuck 32 may have a center-to-center length of 320 mm between the centers of respective joint fittings on opposite ends of the segment 60, while the segments 60 further from the chuck 32 may have a center-to-center length of 270 mm. As shown in FIGS. 9A-9B, an arm 58 comprising a plurality of three or more segments 60 requires a smaller lateral footprint and thereby allows for the standardized containers 22 to be arranged in the racks 36, 54 with a smaller lateral pitch than is possible in with arms 58 of the prior art, which required additional lateral space between columns to prevent mechanical interference such as is shown in FIG. 8A. Such an arm 58 arrangement with three or more joints may also allow for storage racks 36, 54 having three or more levels, where storage racks 36, 54 of the prior art may have been limited to two levels due to the impracticability of increasing the lateral storage pitch as would be required to accommodate an actuated arm 58 without mechanical interference as is shown in FIG. 8A.

Figures 10, 11:
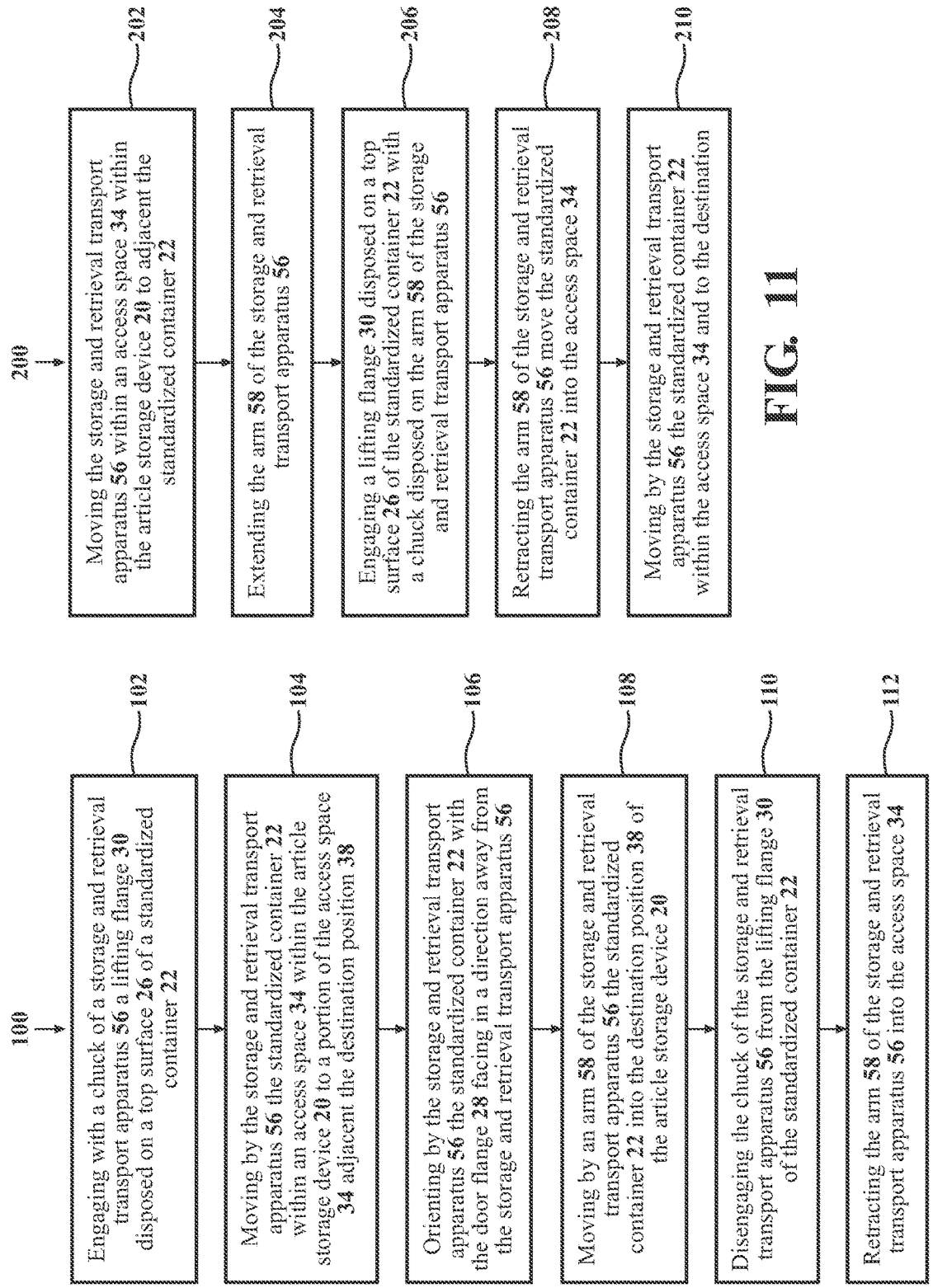
FIG. 10 is a flow chart of a method of moving a standardized container to a destination position within an article storage device.
FIG. 11 is a flow chart of a method of moving a standardized container from an accessible position within an article storage device to a destination position.

A method 100 for moving a standardized container 22 to a destination position 38 within an article storage device 20 is provided. As described in the flowchart of FIG. 10, the method 100 may include one or more of the steps of 102 engaging with a chuck 32 of a storage and retrieval transport apparatus 56 a lifting flange 30 disposed on a top surface 26 of a standardized container 22; 104 moving by the storage and retrieval transport apparatus 56 the standardized container 22 within an access space 34 within the article storage device 20 to a portion of the access space 34 adjacent the destination position 38; 106 orienting by the storage and retrieval transport apparatus 56 the standardized container 22 with the door flange 28 facing in a direction away from the storage and retrieval transport apparatus 56, which may be, for example, perpendicular thereto or opposite the storage and retrieval transport apparatus 56 and the toward the destination position 38; 108 moving by an arm 58 of the storage and retrieval transport apparatus 56 the standardized container 22 into the destination position 38 of the article storage device 20. The step of 108 may be performed by, for example, an arm 58 of the storage and retrieval transport apparatus 56 such as the arm 58 shown in FIGS. 7A-7D. The method 100 may proceed with the steps of 110 disengaging the chuck 32 of the storage and retrieval transport apparatus 56 from the lifting flange 30 of the standardized container 22; and 112 retracting the arm 58 of the storage and retrieval transport apparatus 56 into the access space 34.

A method 200 for moving a standardized container 22 from an accessible position 38 within an article storage device 20 to a destination position 38 is also provided. As described in the flowchart of FIG. 11, the method 200 may include one or more of the steps of 202 moving the storage and retrieval transport apparatus 56 within an access space 34 within the article storage device 20 to adjacent the standardized container 22; 204 extending the arm 58 of the storage and retrieval transport apparatus 56; 206 engaging a lifting flange 30 disposed on a top surface 26 of the standardized container 22 with a chuck 32 disposed on the arm 58 of the storage and retrieval transport apparatus 56; 208 retracting the arm 58 of the storage and retrieval transport apparatus 56 move the standardized container 22 into the access space 34; and 210 moving by the storage and retrieval transport apparatus 56 the standardized container 22 within the access space 34 and to the destination. The destination may be a position 38 within one of the storage racks 36, 54. The destination may be another location including, for example, another storage location or a dock for exiting the article storage device 20.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An article storage device comprising:
a plurality of standardized containers each defining an interior space and extending between a bottom surface extending generally horizontally and a top surface spaced from and generally parallel to said bottom surface, and including an opening side perpendicular to said top and bottom surfaces for providing access to said interior space and a rear side extending generally parallel to said opening side and a pair of sidewalls extending between said opening side and said rear side in generally parallel relationship with one another, and a door flange extending along said opening side and beyond said top surface, and including a lifting flange attached to said top surface for receiving a lifting tool for lifting said standardized container;

an access space for allowing movement of said standardized containers;

at least one storage rack adjacent to said access space and including a plurality of positions each configured to hold one of said plurality of standardized containers;

said plurality of positions of said storage rack configured to hold said storage containers with at least two of said plurality of storage containers arranged side by side relative to said sidewalls and with at least three of said plurality of storage containers arranged in end to end relationship with one another in a direction between said opening and rear sides of said containers;

a storage and retrieval transport apparatus movable within said access space and including an arm configured to move said lifting tool within said at least one storage rack to engage a standardized container located in one of said positions, and to thereby allow said retrieval transport apparatus to move the standardized container to or from said positions;

wherein said standardized containers are each disposed in said at least one storage rack with their respective opening sides oriented in a direction opposite said storage and retrieval transport apparatus and thereby positioning said door flanges out of the path between the access space and said lifting flange of standardized containers for allowing said lifting tool of said retrieval transport apparatus to move in a substantially horizontal plane between said access space to engage said lifting flange of one of said standardized containers without being obstructed by said door flange;

wherein said arm of said storage and retrieval transport apparatus comprises at least four segments with a joint between each of said segments, and wherein said arm includes at least three joints for positioning said lifting tool into engagement with any of said standardized containers in said at least one storage rack without contacting any other of said standardized containers in said at least one storage rack located to a side of said standardized container.

2. An article storage device as set forth in claim 1 wherein said at least four segments includes at least one first segment connected to said lifting tool and at least one second segment spaced from said lifting tool, and wherein said first segment is longer than said second segment.

3. An article storage device as set forth in claim 1 wherein said storage and retrieval transport apparatus further includes at least two motors, with each of said motors causing two of said segments separated by one of said joints to be moved relative to one another.

4. An article storage device as set forth in claim 1 wherein said lifting tool is arranged as a fork with a pair of generally parallel members.

5. An article storage device as set forth in claim 1 wherein said at least one storage rack includes a first storage rack and a second storage rack, and wherein said access space is defined between said first and second storage racks.

6. An article storage device as set forth in claim 1 wherein said plurality of positions include a plurality of rows stacked vertically on top of one another.

7. An article storage device as set forth in claim 6 wherein said plurality of positions further includes a plurality of levels arranged horizontally relative to one another.

8. A method for moving a standardized container having a bottom surface and a top surface extending generally parallel to the top surface, a lifting flange attached to the top surface and extending generally parallel to the top surface, an opening side for providing access to an interior space of the standardized container, and a door flange along the opening side and extending above the top surface, said method comprising the steps of:

positioning the standardized container on a shelf of a storage rock with the opening side oriented in a direction opposite a storage and retrieval transport apparatus;

moving a lifting tool of the storage and retrieval transport apparatus substantially along a horizontal plane in a first direction to a location beneath the lifting flange and engaging the lifting flange;

moving the lifting tool of the storage and retrieval transport apparatus substantially along the horizontal plane in a second direction opposite the first direction to remove the standardized container from the storage rack.

9. The method for moving a standardized container as set forth in claim 8 wherein the arm of the storage and retrieval transport apparatus includes a plurality of segments with a joint between each of the segments, and wherein the arm includes at least three joints for positioning the lifting tool into engagement with any of the standardized containers without contacting any of the other standardized containers in the storage rack.

10. The method for moving a standardized container as set forth in claim 9 wherein the plurality of segments includes at least one first segment connected to the lifting tool and at least one second segment spaced from the lifting tool, and wherein the first segment is longer than the second segment.

11. The method for moving a standardized container as set forth in claim 8 wherein the lifting tool is arranged as a fork with a pair of generally parallel members.

* * * * *